United States Patent
Paar et al.

(10) Patent No.: US 9,809,719 B2
(45) Date of Patent: Nov. 7, 2017

(54) CATIONIC PAINT ADDITIVES

(71) Applicant: Allnex Austria GmbH, Werndorf (AT)

(72) Inventors: Willibald Paar, Graz (AT); Roland Feola, Graz (AT)

(73) Assignee: ALLNEX AUSTRIA GMBH, Werndorf (AT)

( * ) Notice: Subject to any disclaimer, the term of this patent is extended or adjusted under 35 U.S.C. 154(b) by 207 days.

(21) Appl. No.: 14/762,240

(22) PCT Filed: Feb. 28, 2014

(86) PCT No.: PCT/EP2014/053991
§ 371 (c)(1),
(2) Date: Jul. 21, 2015

(87) PCT Pub. No.: WO2014/135466
PCT Pub. Date: Sep. 12, 2014

(65) Prior Publication Data
US 2015/0344706 A1    Dec. 3, 2015

(30) Foreign Application Priority Data
Mar. 6, 2013 (EP) ..................................... 13158051

(51) Int. Cl.
C09D 5/44 (2006.01)
C09D 163/00 (2006.01)
C25D 13/06 (2006.01)
C09D 5/08 (2006.01)

(52) U.S. Cl.
CPC ............. C09D 5/448 (2013.01); C09D 5/08 (2013.01); C09D 5/082 (2013.01); C09D 5/4438 (2013.01); C09D 163/00 (2013.01); C25D 13/06 (2013.01)

(58) Field of Classification Search
None
See application file for complete search history.

(56) References Cited

U.S. PATENT DOCUMENTS

| | | | |
|---|---|---|---|
| 4,376,849 A | 3/1983 | Kempter et al. | |
| 4,752,631 A | 6/1988 | Schupp et al. | |
| 4,865,704 A | 9/1989 | Saatweber et al. | |
| 5,095,051 A | 3/1992 | Chung et al. | |
| 5,275,707 A | 1/1994 | Yamada et al. | |
| 5,472,998 A * | 12/1995 | Tessmer | C08G 59/4042 204/489 |
| 6,589,411 B1 | 7/2003 | Kimpel et al. | |
| 7,374,650 B2 | 5/2008 | Klein et al. | |
| 7,632,386 B2 | 12/2009 | Klein et al. | |

FOREIGN PATENT DOCUMENTS

| | | |
|---|---|---|
| CN | 86 1 08712 | 11/1987 |
| CN | 101928505 | 12/2010 |
| EP | 0 043 934 | 1/1982 |
| JP | 61-73899 | 4/1986 |
| JP | 2002-270996 | 4/2004 |
| WO | 92/02589 | 2/1992 |

OTHER PUBLICATIONS

International Search Report dated Mar. 27, 2014 in International (PCT) Application No. PCT/EP2014/053991.

* cited by examiner

*Primary Examiner* — Kishor Mayekar
(74) *Attorney, Agent, or Firm* — Wenderoth, Lind & Ponack, L.L.P.

(57) ABSTRACT

The invention relates to process for the reduction of corrosion of base metals comprising coating the surfaces of a base metal part with a cathodic electrodeposition paint comprising a cationic paint additive C which is a plastified reaction product of epoxide resins E and amines A, wherein the reaction products of epoxides E and amines A further comprise moieties of aromatic or aliphatic dihydroxy or polyhydroxy compounds D, and preferably also of fatty acids F having from six to thirty carbon atoms, and optionally, one or more olefinic unsaturations, and wherein at least a part of the plastifier P is incorporated by chemical reaction within the reaction products of epoxide resins E and amines A.

18 Claims, No Drawings

CATIONIC PAINT ADDITIVES

FIELD OF THE INVENTION

The invention relates to cationic paint additives and to a method of use thereof as an additive in cathodically depositable aqueous coating compositions to improve edge-covering of such paints and hence the corrosion resistance of base metals to which such paints are applied.

BACKGROUND OF THE INVENTION

When coating a car body by electrodeposition of charged paint binder particles, film thickness of the deposited coating composition usually varies, depending in the field strength and on the coalescence and surface tension properties of the deposited film which in its uncured state is still flexible. After curing, the deposited film forms a coating which protects the covered substrate from corrosion. It is of particular importance to obtain a coating that covers all surfaces of the substrate that are exposed to chemicals such as acids, bases, salt solutions, or oxydising agents, especially for substrates that are, or comprise, base metals. Experience has shown that edges of metal sheets are particularly prone to such attack which ultimately leads to corrosion.

Several methods have already been disclosed to improve the edge corrosion of the cathodic electrodeposition paints.

In JP 61-073 899 A, a method to improve the corrosion resistance of metals coated with a cathodic electrodeposition is disclosed which comprises limiting the deposition voltage between 100 V and 200 V and the deposition time between two minutes and five minutes. These limits are, however, dependent on the bath composition, and have to be determined for each bath composition beforehand.

In JP 02-270 996 A, a method is disclosed to form a coating film having excellent smoothness and edge covering property by temporarily stopping switching off and back on the voltage at the time of depositing a coating film on an object to be coated by a cationic electrodeposition paint.

In U.S. Pat. No. 5,275,707, a method has been disclosed for improving edge covering by adding electrically semiconductive particles to a first cathodic electrodeposition paint, and by depositing two layers on the substrate, the first layer with such modified cathodic electrodeposition paint, and the second layer over the first layer by using a non-modified cathodic electrodeposition paint. This method needs two consecutive electrodeposition steps.

In U.S. Pat. No. 6,589,411, improved edge corrosion resistance is achieved by drying the coated substrate with near infrared radiation to effect crosslinking. However, parts of a car body which are not accessible to the radiation need an additional curing step by exposing to heated gases.

In U.S. Pat. No. 7,632,386, a method to improve edge corrosion resistance is described which comprises treating the still non-crosslinked cathodic electrodeposition paint coating layer with an aqueous preparation of bismuth, neodymium or yttrium salts. This method introduces a further treatment step between the cathodic deposition step, and the heating step.

In U.S. Pat. No. 4,865,704, a method to improve the protection of edges of the substrate is described which comprises adding to a customary cathodic electrodeposition paint based on adducts of epoxide resins and amines, an amino-functional poly(meth)acrylate resin which is made in a two-step synthesis including polymerisation of a mixture of olefinically unsaturated monomers including at east one epoxide-functional olefinically unsaturated monomer to form an epoxide-functional poly(meth)acrylate, and reacting this polymer with a secondary amine to obtain an amino-functional poly(meth)acrylate resin. As the corrosion protection properties of acrylate-type resins are worse than those of resins based on epoxide amine adducts, this technology is less attractive.

In U.S. Pat. No. 7,374,650, improved edge protection is disclosed which is effected by using a cathodic electrodeposition paint which comprises at least one bismuth salt, and at least one compound selected from the group consisting of yttrium compounds and neodymium compounds in a ratio of mass of these compounds to the mass solid resin of from 0.1% to 1% (1 g:1 kg to 10 g:1 kg). Addition of salts that form ions in water to an aqueous cathodic electrodeposition paint leads to impaired electrodeposition.

It is therefore the object of the invention to provide a coating composition which can be used for electrophoretic deposition of electrically conductive substrates without additional process steps, and which leads in a reliable and predictable way to improved edge-covering of the coated substrate, and thus, to reduced propensity for corrosion.

SUMMARY OF THE INVENTION

It has been found, in the experiments underlying the invention, that modification of cathodically depositable paints, in particular those based on cationic binders, such as those based on adducts of epoxy resins and amines and those based on cationic acrylics, by addition of cationic paint additives C which are based on plastified reaction products of epoxide resins and amines leads to a marked improvement of edge corrosion resistance. This improvement is believed to be due to suppressing or reduction of the propensity of a coating film to flow away from the edges during evaporation of solvent (water) and the early phases of crosslinking, this reduction also referred to as "improved edge covering". In the context of this invention, fatty acid amidoamines can preferably be used as plastifiers for adducts formed from epoxide resins and amines. These plastified adducts of epoxide resins and amines can be used as cationic paint additives which are preferably added to the cathodic electrodeposition paint in a ratio of the mass $m_C$ of the solid resins present in the cationic paint additive C to the mass $m_{CEDP}$ which is the sum of the mass of solid resin and the mass of crosslinking agent in the cathodic electrodeposition paint of from 1:5 to 1:20, particularly preferably from 1:8 to 1:17, the mass ratio in each case being based on the masses of the solid resin constituents.

DETAILED DESCRIPTION OF THE PREFERRED EMBODIMENTS

The cationic paint additive C is a plastified reaction product of epoxide resins E and amines A, wherein the reaction products of epoxides E and amines A further comprise moieties of aromatic or aliphatic dihydroxy or polyhydroxy compounds D, and preferably also of fatty acids F having from six to thirty carbon atoms, and optionally, one or more olefinic unsaturations, and wherein at least a part of the plastifier P is incorporated by chemical reaction within the reaction products of epoxide resins E and amines A. The cationic paint additives C of this invention are plastified reaction products of epoxide resins E and amines A, wherein the reaction of epoxide resins E and amines A is preferably conducted in the presence of a plastifier P, and further, of aromatic or aliphatic dihydroxy or polyhydroxy compounds D, and preferably also of fatty acids F having from six to thirty carbon atoms, and optionally, one or more olefinic unsaturations. This reaction leads to at least partial incorporation of the plastifier P into the reaction product of epoxide resins E and amines A, by chemical reaction of epoxide groups of the epoxide resins E with amino groups that are also present in the plastifier P.

Incorporation of the plastifier occurs in a way that at least a mass fraction of 5%, preferably at least 10%, and more preferred, at least 15%, of the plastifier is chemically incorporated into the reaction product of epoxide resins E and amines A and the further reactants as described supra. This incorporation can be shown by extraction experiments of the plastifier P from the cationic paint additive C, where it can be shown that only 95% or less, preferably only 90% or less, more preferably only 85% or less, of the plastifier P can be extracted from the cationic paint additive C.

The amines A preferably comprise at least one amine A1 having at least one primary or secondary amino group, from three to twenty carbon atoms, and optionally at least one hydroxyl group, which amine A1 may be an aliphatic amine or an aliphatic-aromatic amine wherein the aminic nitrogen atom is bound to an aliphatic carbon atom. They preferably also comprise at least one aliphatic amine A2 having from three to twenty carbon atoms, at least one primary amino group, and at least one tertiary amino group.

Preferred amines A1 are n-butylamine, n-hexylamine, 2-ethylhexylamine, cyclohexylamine, diethylamine, di-n-propylamine, diisopropylamine, di-n-butylamine, morpholine, ethanolamine, diethanolamine, and diisopropanolamine, as well as ethylene diamine, 1,4-diaminobutane, isomers of cyclohexane diamine, benzylamine, and isomers of xylylenediamine, or their mixtures.

Preferred amines A2 are N,N-dimethyl ethylenediamine, 2-dimethylaminopropylamine, N,N-diethyl ethylenediamine, 2-diethylaminopropylamine, N-(2-aminoethyl)-morpholine, N-(2-aminoethyl)-piperidine, N-(2-aminoethyl)-pyrrolidine, and N-(2-aminoethyl)-piperazine, or mixtures of at least two of these.

Preferred epoxide resins E are glycidyl ethers of at least dihydric phenols or alcohols such as those based on bisphenol A (2,2-bis-(4-hydroxyphenyl)-propane), bisphenol F (bis-(4-hydroxyphenyl)-methane), or their mixtures, those based on aliphatic diols such as polyoxypropylene glycol, or those based on novolaks. It is also possible to use esters of glycidol with at least dibasic acids, or epoxidised aliphatic compounds derived from aliphatic compounds that have at least two olefinic unsaturations.

The reaction products EA of epoxide resins E and amines A may additionally comprise, in a preferred embodiment, moieties derived from dihydric or more than dihydric hydroxy functional compounds different from those used to prepare the epoxide resin, e. g., moieties of bisphenol F in a reaction product from a bisphenol A-based epoxide resin with the said amines, or moieties derived from epoxidised oils having at least two olefinic unsaturations.

The aromatic or aliphatic dihydroxy or polyhydroxy compounds D having at least two hydroxyl groups are selected from the group consisting of bisphenol A (2,2-bis-(4-hydroxyphenyl)-propane), bisphenol F (bis-(4-hydroxyphenyl)-methane), or their mixtures, aliphatic diols such as polyoxypropylene glycol, or novolaks having on average at least three hydroxymethyl groups per molecule.

The preferred fatty acids F may be saturated or unsaturated and have from eight to thirty carbon atoms. Preferred acids are stearic and palmitic acid, linoleic, linolenic, and oleic acid, and particularly, mixtures of fatty acids from natural sources such as soy bean oil fatty acid, coconut fatty acid, linseed oil fatty acid, tall oil fatty acid, and castor oil fatty acid.

The preferred plastifiers P are selected from reaction products PFA of multifunctional amines PA having at least one primary and at least one secondary amino group, and of fatty acids PF, or their esters PFE, or mixtures of both.

The preferred amines PA are amines having at least one primary and at least one secondary amino group, preferably at least two primary amino groups and at least one secondary amino group. Preferred amines are diethylene triamine, triethylene tetramine, and tetraethylene pentamine, as well as 4,4'-diamino-di-n-butylamine, N,N'-bis-(4-aminobutyl)-1,4-diaminobutane, 6,6'-diamino-di-n-hexylamine, and N,N'-bis-(6-amino-n-hexyl)-1,6-diamino-n-hexane.

The preferred fatty acids PF are independently selected from the same group as the fatty acids F as listed supra.

The preferred fatty acid esters PFE are esters of at least dihydric aliphatic alcohols with the fatty acids PF; particularly preferable are oils which are esters of saturated or unsaturated fatty acids, or mixtures of these, with glycerol. Esters of fatty acids PF with higher alcohols such as mannitol or sorbitol may also be used.

It is preferred to make the plasticisers P by reaction of the amines PA with the fatty acids PF or the fatty acid esters PFE, or with their mixtures, at a temperature of at least 75° C., and optionally in the presence of catalysts that catalyse transesterification or transamidation reactions, mostly transition metal compounds.

The plastified cationic additive dispersions are preferably made in a three-step reaction where in the first step which is preferably conducted in bulk or in an organic solvent, a fatty acid amidoamine is made by reacting the amine PA with the fatty acid PF, or the fatty acid ester, PFE, or mixtures of both. In the second step, the amine-functional reaction product P of the first step is present during the reaction of a mixture of an epoxide resin E, an at least dihydric hydroxy compound D, a mixture of amines A comprising at least one amine A1 and at least one amine A2, and optionally, also a fatty acid F. The product mixture comprising a modified epoxide-amine adduct and the reaction product P is then neutralised by adding an acid, or a solution of an acid in water, the neutralised product mixture is dispersed in water, and this dispersion is reacted in the third step, with further epoxide resin to yield the cationic paint additive C dispersed in water. The resulting cationic paint additive dispersions are usually set to a mass fraction of solids of between 30% and 50% after neutralisation.

In a further preferred embodiment, it is also possible to conduct the reaction of the epoxide resins E and the amines A in the presence of the educts for the plastifier P as mentioned supra.

The cationic paint additive C is usually under the form of an aqueous dispersion, typically with a solid content of from 1 to 50% by weight.

In a still further embodiment, a blocked isocyanate as curing agent may be added to the reaction product of the second step. This is particularly preferred if large amounts of this cationic paint additive C are used as the amount of curing agent is usually adapted to the consumption of the binder resin, the additive usually not being considered.

The cationic paint additive C preferably has a dynamic viscosity of from 10 to 1000 mPa·s at 23° C. and a shear rate of 100 $s^{-1}$.

The cationic paint additive C preferably has a Staudinger-Index $J_g$ of at least 20, more preferably of at least 50, $cm^3/g$ (measured on a solution with N-methylpyrrolidone as solvent at 23° C. according to according to DIN 1342, part 2.4 as described here below).

Dispersions of the cationic paint additive C are preferably added to aqueous cathodic electrodeposition paints and unexpectedly, markedly improve the edge corrosion protection of base metal parts that are coated with these modified cathodic electrodeposition paints.

The cathodic electrodeposition paints are preferably based on epoxy amino adducts or on cationic acrylic resins, usually designated as the binder. Typical epoxy amine adducts are based on aromatic epoxy resins, which are reacted with primary and secondary amines and other epoxy reactive components such as organic acids and/or phenolic compounds. In a preferred version, the epoxy resins are based on Bisphenol A diglycidylether, reacted with primary-tertiary diamines and other modificators.

The cationic acrylic resins are usually based on acrylates which carry tertiary amino groups by introduction of cationic monomers such as dialkylaminoalkyl(meth)acrylates.

Cathodic electrodeposition paints based on epoxy amine adducts as binders are preferred.

The crosslinkage of the binders is preferably done by addition of blocked polyisocyanates, which deblock and cure at temperatures between 120-200° C.

The cathodic electrodeposition paints usually comprise from 10 to 20% by weight of cationic resin and crosslinking agent.

The cathodic electrodeposition paints usually comprise from 7 to 15% by weight (solid), preferably from 7 to 10% by weight, of epoxy-amine adduct or cationic acrylic, more preferably of the epoxy-amine adduct.

The cathodic electrodeposition paints usually comprise from 2 to 5% by weight (solid) of crosslinking agent, more specifically blocked polyisocyanates.

The cathodic electrodeposition paints may comprise further ingredients, such as pigment pastes and catalysts.

The cationic paint additives C are preferably present in the aqueous cathodic electrodeposition paints in a concentration from 0.3 to 5% by weight (solid).

The cationic paint additives C are preferably added to the cathodic electrodeposition paint in a ratio of the mass $m_C$ of the solid resins present in the cationic paint additive C to the mass $m_{CEDP}$ which is the sum of the mass of solid resin of the cationic paint binder in the cathodic electrodeposition paint of from 1:5 to 1:20, particularly preferably from 1:8 to 1:17, the mass ratio in each case being based on the masses of the solid resin constituents.

The coating with the cathodic electrodeposition paint can be done by any technology suited therefore; conventional cathodic electrocoating processes have been described since long. An electrocoating tank typically contains two electrically conductive electrodes wherein the cathode the object is that is to be coated, such as an auto body, a metallic part or a plastic or other substrate coated with an electrically conductive coating. An adherent film is deposited on the cathode by applying sufficient voltage between the electrodes. After the object has been electrocoated, it is typically cured by baking at elevated temperatures such as 80 to 260° C. for a sufficient time to cure the coating.

The invention is further illustrated by the following examples.

The following abbreviations are used in the examples:
DOLA diethanolamine, M=105.24 g/mol
DEAPA N,N-diethylaminopropylamine, M=130.23 g/mol
DMAPA N,N-dimethylaminopropylamine, M=102.18 g/mol
TOFA tall oil fatty acid, iodine number (DIN 53241-1) of 150 cg/g, M=280 g/mol
BA bisphenol A, 2,2-bis(4-hydroxyphenyl) propane, M=228.29 g/mol
CE Cardura E 10, commercial mixture of M=228.33 g/mol
EP 1 difunctional epoxy resin based on bisphenol A, specific content of epoxide groups is 2.08 mol/kg
EP 2 difunctional epoxy resin based on bisphenol A, specific content of epoxide groups is 5.26 mol/kg
AcOH acetic acid (undiluted)
LA lactic acid (where "LA 50%" stands for an aqueous solution of lactic acid with a mass fraction of lactic acid in the aqueous solution of 50%)

The acid number is defined, according to DIN EN ISO 3682 (DIN 53 402), as the ratio of that mass $m_{KOH}$ of potassium hydroxide which is needed to neutralise the sample B under examination, and the mass $m_B$ of this sample, or the mass of the solids in the sample B in the case of a solution or dispersion; the customary unit is "mg/g".

The hydroxyl number is defined according to DIN EN ISO 4629 (DIN 53 240) as the ratio of the mass of potassium hydroxide $m_{KOH}$ having the same number of hydroxyl groups as the sample B, and the mass $m_B$ of that sample, or the mass of solids in the sample B in the case of a solution or dispersion; the customary unit is "mg/g".

The physical quantity formerly referred to as "limiting viscosity number", properly named "Staudinger-Index" $J_g$ according to DIN 1342, part 2.4, is the limiting value of the Staudinger function $J_v$ for decreasing concentration and shear gradient, wherein $J_v$ stands for the relative change in viscosity divided by the mass concentration $\beta_B = m_B/V$ of the solute B (having a mass $m_B$ of the solute in a volume V of the solution), viz., $J_v = (\eta_r - 1)/\beta_B$. The relative change in viscosity $\eta_r - 1$ is calculated as $\eta_r - 1 = (\eta - \eta_s)/\eta_s$. The relative viscosity $\eta_r$ is the ratio of the dynamic viscosity $\eta$ of the solution under consideration, and the dynamic viscosity $\eta_s$ of the pure solvent. The physical significance of the Staudinger index is that of a specific hydrodynamic volume of the solvated polymer coils at infinite dilution in the state of rest. The unit generally accepted for J is "cm$^3$/g"; formerly often "dl/g".

Example 1 Synthesis of the Plasticiser Components P

Example 1a PFA1 (Fatty Acid Amide)

146 g (1.0 mol) of triethylene tetramine and 1760 g (2.0 mol) of linseed oil were charged into a three-neck vessel of 3 l capacity, equipped with thermometer, stirrer, and reflux condenser, and heated to 95° C. The temperature was held for six hours under stirring by which time at least 95% of the primary amino groups had reacted under formation of amide groups. The amine number decreased during this reaction from an initial value of 117 mg/g to 61 mg/g. The yield was 1900 g.

Example 1b PFA2 (Fatty Acid Amide)

The procedure of Example 1a was repeated with 146 g (1.0 mol) of triethylene tetramine and 1320 g (1.5 mol) of linseed oil. After stirring for six hours at 95° C., the amine number had decreased during this reaction from an initial value of 153 mg/g to 79 mg/g. The yield was 1460 g.

Example 1c PFA3 (Fatty Acid Amide)

The procedure of Example 1a was repeated with 146 g (1.0 mol) of triethylene tetramine and 880 g (1.0 mol) of linseed oil. After seven hours stirring at 95° C., the amine number had decreased during this reaction from an initial value of 218 mg/g to 114 mg/g. The yield was 1020 g.

Example 1d PFA 4 (Fatty Acid Amide)

215 g (1.0 mol) of bis-hexamethylene triamine were heated to 40° C. Under stirring, 560 g (2.0 mol) of TOFA were added during fifteen minutes, and the reaction mixture was heated by taking advantage of the exothermic neutralisation reaction to 150° C. within one hour. This temperature was kept during separation of the water (36 g) formed in the reaction, for further three hours. The reaction mixture was then heated to 180° C. within two further hours until the amine number had reached approximately 76 mg/g, corresponding to an amount of substance of residual secondary amino groups of 1 mol. 730 g of a brownish pasty solid were obtained, having an amine number of 75 mg/g, and an acid number of 8 mg/g.

Example 2 Synthesis of Cationic Additives

Example 2a Non-Plastified Cationic Additive Dispersion

A three-neck vessel equipped with stirrer, thermometer and reflux condenser was charged with 960 g of a bisphenol A-based epoxy resin EP1 having a specific content of epoxide groups of 2.08 mol/kg, 484 g of methoxypropanol were added, and the mixture was heated under stirring to 70° C. and held at that temperature until a clear solution had been obtained. 105 g (1.0 mol) of diethanolamine (DOLA) and 65 g (0.5 mol) diethylaminopropylamine (DEAPA) were then added under stirring, the mixture was heated to 120° C. and stirred at this temperature for two more hours until no more free epoxide groups could be detected. The amine groups were partially neutralised by addition of 33.9 g of acetic acid (specific amount of substance of acetic acid of 0.50 mol/kg, based on the mass of resin solids). The resin solution this obtained was then diluted by addition of deionised water to a mass fraction of solids of 35%.

This solution was then heated to 70° C., whereupon 200 g of an epoxy resin EP2 based on bisphenol A were added, having a specific amount of substance of epoxide groups of 5.26 mol/kg. The mixture obtained was stirred for three hours at 70° C. until no more free epoxide groups could be detected. Finally, the mixture obtained was diluted by addition of deionised water to a mass fraction of solids of 40%. The following characteristics had been measured: pH=4.6, dynamic viscosity η=380 mPa·s at 23° C. and a shear rate of 100 s$^{-1}$, Staudinger-Index $J_g$=68 cm$^3$/g (measured on a solution with N-methylpyrrolidone as solvent at 23° C.).

Example 2b Amide-Plastified Cationic Additive Dispersion

Into a three-neck glass vessel equipped with stirrer, reflux condenser, and thermometer, 1906 g (1.0 mol) of the aminofunctional fatty acid amide PFA1 of Example 1a, and 560 g (2.0 mol) TOFA were charged and heated to 80° C. Under stirring, the following chemicals were added in this sequence: 960 g (4.2 mol) of BA, 210 g (2.0 mol) of DOLA, and 184 g (1.8 mol) of DMAPA. A clear melt was obtained after one hour. Within ninety minutes, 4530 g (11.9 mol) of epoxide resin EP2 were added under stirring, which made the temperature rise to 160° C. due to the exothermy of the reaction. This temperature was held for one hour after which no more free epoxide groups could be detected. Into a dilution kettle, 9000 g of water and 677 g of an aqueous lactic acid solution having a mass fraction of 50% lactic acid were charged, whereafter the liquid resin was added thereto under mixing during thirty minutes. The temperature of the mixture was then adjusted to 70° C., and homogenisation was continued for one hour. By addition of deionised water in several portions, the mixture was reduced to a mass fraction of solids of 43%. The aqueous dispersion thus obtained was then heated to 80° C., and a second portion of 400 g (1.05 mol) of epoxide resin EP2 was added, and the resulting mixture was stirred for two more hours at 80° C. Finally, the dispersion was diluted to a mass fraction of solids of 40%. The following characteristics were determined on this dispersion: pH=4.0, dynamic viscosity η=290 mPa·s at 23° C. and a shear rate of 100 s$^{-1}$, Staudinger-Index $J_g$=58 cm$^3$/g (measured on a solution with N-methylpyrrolidone as solvent at 23° C.).

Further plastified cationic additive dispersions were made in analogy to this example 2b, see examples 2c, 2d, and 2e of table 1. Components used are specified by their chemical nature ("Kind", see explanation of the abbreviations supra), and the mass m and the amount of substance n used. All dispersions of this example 2 had a value of the Staudinger index of at least 50 cm$^3$/g.

Example 2f "Intrinsically" Plastified Cationic Additive Dispersion

A three-neck vessel equipped with stirrer, reflux condenser and thermometer was charged with 106 g (1.0 mol) of diethylene triamine and 560 g (2.0 mol) of tall oil fatty acid having an iodine number of 150 cg/g, and heated under stirring by also taking advantage of the exothermic salt formation to 80° C. Under continued stirring, 750 g (3.0 mol) of glycidyl neodecanoate (®Cardura E) were added within one hour, keeping the temperature by cooling so that 90° C. was not exceeded. After complete addition, the reaction mixture was kept at that temperature, and then, temperature was kept at 90° C. for one further hour. Thereafter, the following components were added under stirring, in sequence: 912 g (4.0 mol) of bisphenol A, 210 g (2.0 mol) of diethanolamine, and 184 g (1.8 mol) of dimethylamino propylamine, and the resulting mixture was then stirred at 80° C. for one hour until a clear solution was obtained. At this temperature of 80° C., 3600 g (9.5 mol) of epoxy resin EP2 were added uniformly over ninety minutes, the strong exothermy having been controlled by cooling as needed to limit the temperature of the reaction mixture to not more than 160° C. This temperature of 160° C. was kept for one hour until no more free epoxide groups could be detected. Into a dilution vessel, 8000 g of deionised water and 677 g of an aqueous solution of lactic acid having a mass fraction of lactic acid of 50% were charged, and the reaction mixture prepared as detailed supra was admixed within thirty minutes under stirring. The temperature of the aqueous mixture was then adjusted to 70° C., and homogenised for one hour at this temperature. The mass fraction of solids was then adjusted to 43% by adding small portions of water, starting from a calculated mass fraction of solids of 44.4%. The aqueous resin dispersion thus obtained was heated to 80° C. whereafter a second portion of 400 g (1.05 mol) of EP2 was added, and the mixture was stirred for two further hours at 80° C. Finally, the mass fraction of solids was adjusted to 40% by addition of further deionised water. The following characteristics had been determined on a sample drawn from this dispersion: pH=4.3, dynamic viscosity η=266 mPa·s (25° C., 100 s$^{-1}$), Staudinger-Index $J_g$=61 cm$^3$/g.

TABLE 1

Plastified Cationic Additive Dispersions

| | Epoxide-Reactive Components | | | Epoxide Resin | | | Neutralisation | | |
|---|---|---|---|---|---|---|---|---|---|
| | m/g | n/mol | Kind | m/g | n/mol | Kind | m/g | n/mol | Kind |
| 2a | 105 | 1.0 | DOLA | 960 | 1 | EP1 | 33.9 | 0.56 | AcOH |
| | 65 | 0.5 | DEAPA | 200 | 0.53 | EP2 | | | |
| 2b | 1906 | 1.0 | PFA1 | 4530 | 11.9 | EP2 | 677 | 3.8 | LA 50% |
| | 280 | 1.0 | TOFA | 400 | 1.05 | EP2 | | | |
| | 960 | 4.2 | BA | | | | | | |
| | 210 | 2.0 | DOLA | | | | | | |
| | 184 | 1.8 | DMAPA | | | | | | |
| 2c | 1466 | 1.0 | PFA2 | 4104 | 10.8 | EP2 | 210 | 3.5 | AcOH |
| | 560 | 2.0 | TOFA | 400 | 1.05 | EP2 | | | |
| | 960 | 4.2 | BA | | | | | | |
| | 210 | 2.0 | DOLA | | | | | | |
| | 184 | 1.8 | DMAPA | | | | | | |
| 2d | 1026 | 1.0 | PFA3 | 3876 | 10.2 | EP2 | 594 | 3.3 | LA 50% |
| | 560 | 2.0 | TOFA | 400 | 1.05 | EP2 | | | |
| | 960 | 4.2 | BA | | | | | | |
| | 210 | 2.0 | DOLA | | | | | | |
| | 234 | 1.8 | DEAPA | | | | | | |
| 2e | 739 | 1.0 | PFA4 | 3724 | 9.8 | EP2 | 520 | 2.9 | LA 50% |
| | 560 | 2.0 | TOFA | 400 | 1.05 | EP2 | | | |
| | 960 | 4.2 | BA | | | | | | |
| | 105 | 1.0 | DOLA | | | | | | |
| | 184 | 1.8 | DMAPA | | | | | | |
| 2f | 106 | 1.0 | DETA | 3600 | 9.5 | EP2 | 420 | 2.3 | LA 50% |
| | 560 | 2.0 | TOFA | 400 | 1.05 | EP2 | | | |
| | 750 | 3.0 | CE | | | | | | |
| | 912 | 4.0 | BA | | | | | | |
| | 210 | 2.0 | DOLA | | | | | | |
| | 184 | 1.8 | DMAPA | | | | | | |

In a further preferred embodiment, it is also possible to add capped isocyanates as curing agents to the cationic paint additives as described supra before dilution thereof with water and acids. Particularly useful are capped isocyanates made by reacting polyhydric alcohols with diisocyanates which are blocked with aliphatic branched alcohols, such as reaction products of 1 mol of trimethylolpropane with 2.8 mol of toluylene diisocyanate which is half-blocked with 2-ethyl hexanol. In this embodiment, the epoxide-amine adduct resin solutions (which are diluted to a mass fraction of solids of, e. g., 80% by addition of a solvent if made in a solvent-free process, e. g. by adding methoxypropanol at a temperature of from 130° C. to 170° C.) are brought to a temperature of from 100° C. to 130° C. In this temperature range, the curing agent is added and homogenised in the resin solution. Neutralisation with acid and dilution with water are performed on the mixture of curing agent and resin solution, as described in the examples supra.

Example 3 Preparation of a CED Paint

Example 3a Preparation of a Dibutyl Tin Oxide Catalyst Paste

In a resin kettle, 1400 g of a liquid polybutadiene having a weight average molar mass of 3 kg/mol (Polyoel® B 180, Evonik) and 200 g of maleic anhydride were reacted in the presence of 2 g of N,N'-diphenyl-p-phenylene diamine as inhibitor under a nitrogen blanket at a temperature between 180° C. and 210° C. until no more free anhydride could be detected. After cooling to 60° C., 70 g of methanol were added over thirty minutes. The reaction mixture was stirred at this temperature until an acid number of 70 mg/g was reached. Then, 260 g of 3-diethylamino-1-propylamine were added in the course of one hour. After complete addition, the reaction mixture was heated to 160° C. and kept at this temperature until no more methanol was distilled off, and the acid number had reached a value of below 3 mg/g. The reaction mixture was then cooled to 100° C., and diluted by addition of methoxypropanol to a mass fraction of solids of 80%. The graft product had an amine number of 60 mg/g. 1000 g of the solution thus prepared were slowly added under stirring to a mixture of 2400 g of deionised water and 39.2 g of formic acid. After stirring for a further hour, a brownish homogeneous dispersion having a mass fraction of solids of 23.3%, and a pH of 3.7 was obtained. 344 g of this dispersion were charged in a reaction vessel equipped with a reflux condenser, a dropping funnel, and nitrogen purging, 35 g of deionised water were added, and the mixture was heated to 80° C. At this temperature, a mixture of 40 g of styrene, 2 g of trimethylolpropane trimethacrylate, and 2 g of azobis-isovaleronitrile were uniformly added during six hours. After a post-reaction of four hours at 85° C., a dispersion with a mass fraction of solids of at least 29% was obtained.

The following parameters were determined on this dispersion:

| | |
|---|---|
| mass fraction of solids | 29.3% |
| amine number | 46 mg/g |
| weight average molar mass | 50 kg/mol |

A catalyst emulsion was prepared from dibutyl tin oxide and this dispersion as follows: 641 g of the dispersion were mixed with 45 g of 2-butoxy ethanol, and 224 g of dibutyl tin oxide. After homogenisation, 90 g of acetic acid were added, to yield a catalyst emulsion having a mass fraction of tin of 10.7%.

Example 3b Paste Resin

A paste resin was prepared in the first step by reacting in a vessel equipped with a stirrer, a reflux condenser, and a water trap. 1480 g of ethylene glycol monobutyl ether, 430 g of an aliphatic polyetherdiamine having repeating oxypropylene units, and an average molar mass of 430 g/mol (Jeffamine® D-400, Huntsman Corporation), and 500 g of glycidyl neodecanoate (Cardura™ E10, Momentive Specialty Chemicals Inc.) were charged, 2 g of triphenyl phosphine were added as catalyst, and the mixture was heated to 90° C. under stirring. After two hours, the amount of substance of epoxide groups divided by the mass of the mixture had fallen below 100 mmol/kg. 410 g (1.8 mol) of bisphenol A and 204 g (2.0 mol) of DMAPA were then added, and the temperature of the resulting mixture was set to 80° C. During sixty minutes, 1310 g of the epoxide resin EP2 were uniformly added in a way to keep the reaction mixture below a maximum temperature of 120° C. which necessitated occasional cooling due to the strong exothermy. The temperature of 120° C. was then held constant under stirring until no remaining epoxide groups could be detected any more. The reaction mixture was then cooled to 90° C., and 400 g of xylene as entrainment agent, together with 215 g (2.6 mol) of an aqueous formaldehyde solution with a mass fraction of formaldehyde of 36% were added. The mixture was heated over three hours to reach the distillation temperature of 125° C., and the circulation of xylene was maintained until the theoretical mass of water (180 g) were separated. Finally, the entrainment agent was removed by distillation, and the remaining reaction product was diluted to a mass fraction of solids of 55% by adding further ethylene glycol monobutyl ether. The paste resin solution had a dynamic viscosity of 5640 mPa·s, measured at 23° C. and a shear rate of 100 s$^{-1}$.

Example 3 c Pigment Paste

A pigment paste was made by mixing 380.7 g of deionised water, 20 g of glacial acetic acid, 181.8 g of the paste resin solution supra, 17.5 g of a solution of 2,4,7,9-tetramethyl-5-decyne-4,7-diol (®Surfynol 104, Air Products) in 2-butoxyethanol with a mass fraction of the diol of 50%, and admixing in a ball mill 36.5 g of a carbon black pigment ("Special Black 4" having a mass fraction of volatile matter at 950° C. of 14%, and a specific surface of 180 m$^2$/g, measured according to the BET method, Orion Engineered Carbons GmbH), and 363.5 g of a hydrous aluminium silicate (®ASP 600, Engelhard-BASF SE). 1 kg of black pigment paste was obtained.

Example 3d Preparation of a Fatty Acid Amidoamine 146 g (1 mol) of triethylene tetramine (N,N'-bis-(2-aminoethyl)-1,2-diaminoethane) were heated to 40° C. 560 g (2 mol) of tall oil fatty acid (TOFA) were added under stirring during fifteen minutes; thereafter the mixture was heated, profiting of the slight exotherm, to 150° C. within one hour. The water formed in the reaction was separated, and the mixture was held at 150° C. for a further three hours, and then heated to 180° C. over a period of two further hours. The reaction mixture was held at that temperature until an amine value (determined according to DIN 53 176, as the ratio of that mass m(KOH) of potassium hydroxide that consumes the same amount of acid for neutralisation as the sample under consideration, and the mass m(B) of that sample, or the mass of solid matter in the sample in the case of solutions or dispersions) of approximately 165 mg/g was reached, which corresponds to an amount of substance of 1 mol in this experiment. 670 g of a waxy brown solid were obtained having an amine value of 164.9 mg/g and an acid value of 6.0 mg/g.

Example 3e Preparation of an Amine- and Fatty Acid Amidoamine-Modified Epoxy Resin 1340 g (2 mol) of the amine-functional fatty acid amide from Example 3d were heated in a reaction vessel under stirring to 85° C., whereupon 912 g (4 mol) of bisphenol A, 210 g (2 mol) of diethanolamine, and 184 g (1.8 mol) of dimethylamino propylamine were added under stirring. When a clear melt was obtained at 85° C., 3230 g (8.5 mol) of a liquid epoxide resin based on bisphenol A and having a molar mass of 380 g/mol were added, the temperature rising due to the heat of reaction to about 150° C. The reaction mixture was held at 150° C. for about one hour until no unreacted epoxide groups were detectable. A portion of 500 g (2 mol) of a glycidyl ester of neodecanoic acid (®Cardura E, Momentive Specialty Chemicals) was added and the resulting mixture held under stirring at a temperature of from 70° C. to 80° C. until no free epoxide groups were detectable any more.

Example 3f Preparation of a Crosslinking Agent 1430 g (11 mol) of 2-ethyl hexanol and 3.1 g of sodium phenolate were charged in a glass vessel and heated to 80° C. 1740 g (10 mol) of 2,4-toluylene diisocyanate were added in portions under cooling to keep the temperature in the range of from 80° C. to 85° C. When the whole amount of diisocyanate had been added, the reaction mass was kept at from 80° C. to 90° C. until complete consumption of the isocyanate groups. An allophanate-containing oligomeric isocyanate having an average molar mass of 3170 g/mol and a specific content of crosslinking isocyanate groups of 6.33 mol/kg was obtained.

Example 3g Preparation of a Mixture of CED Binder and Crosslinking Agent 936 g of the modified epoxide-amine resin of example 3e and 281 g of the crosslinking agent of example 3f were mixed and homogenised. A dilution vessel was prepared by charging a mixture of 880 g of deionised water and 30 g of an aqueous solution of acetic acid (having a mass fraction of acetic acid of 60 cg/g in the aqueous solution, 0.3 mol), the homogenised mixture of the modified epoxide-amine resin of example 3e and the crosslinker of example 3f was then added within thirty minutes under stirring. The mass fraction of solids was adjusted to 35%.

Example 3h Preparation of the CED Bath Formulation

CED bath formulations were prepared by mixing the combination of binder resin and crosslinking agent of example 3g with the cationic additive dispersions of example 2, diluting with water, and finally mixing with the catalyst paste of example 3a, and with the pigment paste of example 3b. In the following table 2, the recipes are listed. In the column headings, $m_{3g}$ is the mass of the dispersion made from the combination of binder resin and crosslinking agent of example 3g, $m_2$ is the mass of the cationic paint additive dispersions of example 2, the abbreviations 2a through 2h referring to the individual cationic paint additive dispersions of example 2, and $m_{H2O}$ is the mass of deionised water used for dilution. CED paint 1 was prepared without any addition of an epoxide-amine adduct dispersion of example 2. To each of these mixtures, 11.1 g of the dibutyl tin oxide catalyst paste of example 3a, and 62.5 g of the pigment paste of example 3b were added.

TABLE 2

Variable Part of the Composition of the CED paints (masses of dispersions)

| CED Paint No. | $m_{3g}$ in g | 2a | 2b | 2c | 2d | 2e | 2f | $m_{H2O}$ in g |
|---|---|---|---|---|---|---|---|---|
| 1 | 339.2 | | | | | | | 587.2 |
| 2 | 312.0 | 23.7 | | | | | | 590.7 |
| 3 | 312.0 | | 23.7 | | | | | 590.7 |
| 4 | 312.0 | | | 22.6 | | | | 591.8 |
| 5 | 312.0 | | | | 23.7 | | | 590.7 |
| 6 | 312.0 | | | | | 22.6 | | 591.8 |
| 7 | 312.0 | | | | | | 23.7 | 590.7 |

Example 3e Results

Five identical test panels (steel sheets subjected to zinc and phosphate pretreatment, B26 OC W, supplier Chemetall GmbH) were used for each of the formulations of table 2, rinsed with deionised water and subjected to electrophoretic coating at 30° C. in CED baths filled with the CED paint formulations 1 through 7, the deposition time was two minutes, and the deposition voltage was 300 V. The coated panels were taken out of the bath, rinsed with water, and then left to flash off at room temperature (23° C.) for thirty minutes. The dried coated steel sheets were then subjected to stoving in an oven at 165° C. for twenty minutes.

Edge covering was assessed by visual inspection under a microscope, the value stated is the length of the edge covered by the CED paint film in a specified region of the test panel, divided by the total length of the edge in the specified region.

Edge rust was assessed by subjected to coated test panels to salt spray test (according to DIN EN ISO 9227, issued in October 2006, and DIN EN ISO 4628-8, issued in May 2005), and the value stated is the length of the edge covered by rust in a specified region of the test panel, divided by the total length of the edge in the specified region.

Creep from Scratch was assessed according to ASTM B117, the value stated is the largest corrosion path length after the salt spray treatment from a scratch applied to the centre of the coated test panel.

In the following table 3, the results are listed:

| CED Paint | relative length of covered edge in % | relative length of corroded edge in % | farthest creep from scratch in mm |
|---|---|---|---|
| 1 | 40 | 80 | 3 |
| 2 | 85 | 15 | 1 |
| 3 | 90 | 8 | 1 |
| 4 | 95 | 10 | 1 |
| 5 | 98 | 5 | 1 |
| 6 | 92 | 10 | 1 |
| 7 | 85 | 15 | 1.5 |

The invention claimed is:

1. A process for reducing corrosion of base metals comprising coating a surface of a base metal part with a cathodic electrodeposition paint comprising cationic binders,
    wherein a cationic paint additive C is added to the electrodeposition paint, said cationic paint additive C being a plastified reaction product of epoxide resins E and amines A, wherein the reaction product of epoxide resins E and amines A further comprises moieties of aromatic or aliphatic dihydroxy or polyhydroxy compounds D, and at least a part of a fatty acid amidoamine plastifier P is incorporated by chemical reaction within the reaction product of epoxide resins E and amines A,
    wherein the reaction product of epoxide resins E and amines A optionally further comprises moieties of fatty acids F having from six to thirty carbon atoms, and optionally, one or more olefinic unsaturations.

2. The process as claimed in claim 1 wherein the amines A comprise at least one amine A1 having at least one primary or secondary amino group, from three to twenty carbon atoms, and optionally at least one hydroxyl group, which amine A1 may be an aliphatic amine or an aliphatic-aromatic amine wherein the aminic nitrogen atom is bound to an aliphatic carbon atom.

3. The process as claimed in claim 2 wherein the amines A1 are selected from the group consisting of n-butylamine, n-hexylamine, 2-ethylhexylamine, cyclohexylamine, diethylamine, di-n-propylamine, diisopropylamine, di-n-butylamine, morpholine, ethanolamine, diethanolamine, diisopropanolamine, ethylene diamine, 1,4-diaminobutane, isomers of cyclohexane diamine, benzylamine, isomers of xylylenediamine, and mixtures thereof.

4. The process as claimed in claim 1 wherein the amines A comprise at least one aliphatic amine A2 having from three to twenty carbon atoms, at least one primary amino group, and at least one tertiary amino group.

5. The process as claimed in claim 4 wherein the amines A2 are selected from the group consisting of N,N-dimethyl ethylenediamine, 2-dimethylaminopropylamine, N,N-diethyl ethylenediamine, 2-diethyl aminopropylamine, N-(2-aminoethyl)-morpholine, N-(2-aminoethyl)-piperidine, N-(2-aminoethyl)-pyrrolidine, N-(2-aminoethyl)-piperazine, and mixtures thereof.

6. The process as claimed in claim 1 wherein the epoxide resins E are selected from the group consisting of glycidyl ethers of dihydric phenols or alcohols, mixtures thereof, glycidyl ethers of aliphatic diols, glycidyl ethers of novolaks, esters of glycidol with at least dibasic acids, and epoxidised aliphatic compounds derived from aliphatic compounds that have at least two olefinic unsaturations.

7. The process as claimed in claim 6 wherein the epoxide resins E are selected from the group consisting of glycidyl ethers of bisphenol A (2,2-bis-(4-hydroxyphenyl)-propane), glycidyl ethers of bisphenol F (bis-(4-hydroxyphenyl)-methane), mixtures thereof, and glycidyl ethers of polyoxypropylene glycol.

8. The process as claimed in claim 1 wherein the aromatic or aliphatic dihydroxy or polyhydroxy compounds D having at least two hydroxyl groups are selected from the group consisting of bisphenol A (2,2-bis-(4-hydroxyphenyl)-propane), bisphenol F (bis-(4-hydroxyphenyl)-methane), mixtures thereof, aliphatic diols, and novolaks having on average at least three hydroxymethyl groups per molecule.

9. The process as claimed in claim 1 wherein the fatty acids F are saturated or unsaturated and have from eight to thirty carbon atoms, and are selected from the group consisting of stearic acid, palmitic acid, linoleic acid, linolenic acid, oleic acid, and mixtures of fatty acids from natural sources.

10. The process as claimed in claim 9 wherein the fatty acids from natural sources are selected from the group consisting of soy bean oil fatty acid, coconut fatty acid, linseed oil fatty acid, tall oil fatty acid, and castor oil fatty acid.

11. The process as claimed in claim 1 wherein the fatty acid amidoamine plastifier P is a reaction product PFA of multifunctional amines PA having at least one primary and at least one secondary amino group, and of fatty acids PF, or their esters PFE, or mixtures of both.

12. The process as claimed in claim 11 wherein the amines PA are amines having at least one primary and at least one secondary amino group, and are selected from the group consisting of diethylene triamine, triethylene tetramine, tetraethylene pentamine, 4,4'-diamino-di-n-butylamine, N,N'-bis-(4-aminobutyl)-1,4-diaminobutane, 6,6'-diamino-di-n-hexylamine, and N,N-bis-(6-amino-n-hexyl)-1,6-diamino-n-hexane.

13. The process as claimed in claim 11 wherein the fatty acids PF are saturated or unsaturated and have from eight to thirty carbon atoms, and are selected from the group consisting of stearic acid, palmitic acid, linoleic acid, linolenic acid, oleic acid, and mixtures of fatty acids from natural sources.

14. The process as claimed in claim 13 the fatty acids from natural sources are selected from the group consisting of soy bean oil fatty acid, coconut fatty acid, linseed oil fatty acid, tall oil fatty acid, and castor oil fatty acid.

15. The process as claimed in claim 11 wherein the fatty acid esters PFE are esters of at least dihydric aliphatic alcohols with the fatty acids PF.

16. The process as claimed in claim 15 wherein the fatty acid esters PFE are esters of at least dihydric aliphatic alcohols selected from the group consisting of glycerol, mannitol and sorbitol.

17. The process as claimed in claim 1 wherein the cationic paint additive C is based on epoxide-amine adducts and prepared by a method comprising the steps of
a first step of preparing a fatty acid amidoamine by reacting an amine PA with a fatty acid PF, or a fatty acid ester, PFE, or mixtures of both,
a second step of reacting, in the presence of an amine-functional reaction product P of the first step, a mixture of an epoxide resin E, an at least dihydric hydroxy compound D, a mixture of amines A comprising at least one amine A1 and at least one amine A2, and optionally, a fatty acid F,
a third step of neutralizing a product mixture of the second step comprising a modified epoxide-amine adduct and the reaction product P by adding an acid, or a solution of an acid in water,
a fourth step of dispersing a neutralized product mixture of the third step in water, and
a fifth step of reacting a dispersion of the fourth step with further epoxide resin E to yield the cationic paint additive C dispersed in water.

18. The process as claimed in claim 1 wherein the cationic paint additive C is added to the cathodic electrodeposition paint in a ratio of a mass $m_C$ of solid resins present in the cationic paint additive C to a mass $m_{CEDP}$ which is a sum of the mass of solid resins and a mass of a crosslinking agent in the cathodic electrodeposition paint of $1:5 \leq m_C/m_{CEDP} \leq 1:99$.

* * * * *